US012577016B2

(12) United States Patent
Ma et al.

(10) Patent No.: US 12,577,016 B2
(45) Date of Patent: Mar. 17, 2026

(54) POLE PIECE LABELING CONTROL METHOD AND DEVICE, ELECTRONIC EQUIPMENT, AND STORAGE MEDIUM

(71) Applicant: CONTEMPORARY AMPEREX TECHNOLOGY (HONG KONG) LIMITED, Hong Kong (CN)

(72) Inventors: Lin Ma, Ningde (CN); Chunxu Wu, Ningde (CN); Hongyuan Li, Ningde (CN); Ping Jiang, Ningde (CN); Gaofeng Lu, Ningde (CN)

(73) Assignee: CONTEMPORARY AMPEREX TECHNOLOGY CO., LIMITED, Ningde City (CN)

( * ) Notice: Subject to any disclaimer, the term of this patent is extended or adjusted under 35 U.S.C. 154(b) by 220 days.

(21) Appl. No.: 18/362,330

(22) Filed: Jul. 31, 2023

(65) Prior Publication Data

US 2024/0199267 A1 Jun. 20, 2024

Related U.S. Application Data

(63) Continuation of application No. PCT/CN2023/085227, filed on Apr. 6, 2023.

(30) Foreign Application Priority Data

Dec. 15, 2022 (CN) ......................... 202211609827.3

(51) Int. Cl.
*B65C 9/42* (2006.01)
*B65C 9/40* (2006.01)

(52) U.S. Cl.
CPC .......... *B65C 9/42* (2013.01); *B65C 2009/404* (2013.01)

(58) Field of Classification Search
CPC .... B65C 9/42; B65C 9/40; B65C 9/46; B65C 2009/404; B65C 2009/405
See application file for complete search history.

(56) References Cited

U.S. PATENT DOCUMENTS

2017/0199113 A1 7/2017 Holm et al.

FOREIGN PATENT DOCUMENTS

CN 202471673 U * 10/2012
CN 107703061 A * 2/2018 ............. G01N 21/01
(Continued)

OTHER PUBLICATIONS

International Search Report for International Application PCT/CN2023/085227, mailed Jul. 1, 2023.
(Continued)

*Primary Examiner* — George R Koch
(74) *Attorney, Agent, or Firm* — Ladas & Parry LLP

(57) ABSTRACT

Disclosed are a pole piece labeling control method and device, electronic equipment, and a storage medium. The method includes: acquiring a pole piece image, including a pole piece mark hole image, of a target pole piece; determining a defect detection result according to the pole piece image; determining a first distance according to the pole piece mark hole image; determining a second distance according to the first distance; determining a labeling delay of the target pole piece according to the second distance; and controlling the labeling of the target pole piece according to the labeling delay and the defect detection result. The real-time position of the pole piece transferred on a compression roller is identified through the pole piece mark hole image, so that the accuracy of the labeling delay is improved, and the labeling position based on the labeling delay is more accurate.

15 Claims, 5 Drawing Sheets

(56) References Cited

FOREIGN PATENT DOCUMENTS

| | | | | |
|---|---|---|---|---|
| CN | 208420734 | U | | 1/2019 |
| CN | 109358070 | A | | 2/2019 |
| CN | 111416142 | A | | 7/2020 |
| CN | 211404633 | U | | 9/2020 |
| CN | 113941523 | A | | 1/2022 |
| CN | 113977669 | A | | 1/2022 |
| CN | 114597479 | A | | 6/2022 |
| CN | 114609682 | A | | 6/2022 |
| CN | 114799573 | A | * | 7/2022 |
| CN | 115151997 | A | | 10/2022 |
| CN | 115690097 | A | | 2/2023 |
| WO | 2022052480 | A1 | | 3/2022 |

OTHER PUBLICATIONS

Written Opinion of International Search Authority for International Application PCT/CN2023/085227, mailed Jul. 1, 2023.
First search report of CN application No. 202211609827.3.
First Office Action of CN application No. 202211609827.3, mailed Feb. 7, 2023.
Supplemental search report of CN application No. 202211609827.3.
Notification grant patent right for CN application No. 202211609827.3, mailed Feb. 19, 2023.
Extended European Search Report for EP application No. 23744351.0, dated Mar. 19, 2025.

* cited by examiner

POLE PIECE LABELING CONTROL METHOD AND DEVICE, ELECTRONIC EQUIPMENT, AND STORAGE MEDIUM

CROSS REFERENCE TO RELATED APPLICATIONS

This application is a continuation of International Patent Application No. PCT/CN2023/085227, filed on Apr. 6, 2023, which claims the priority to Chinese Patent Application No. 202211609827.3, filed on Dec. 15, 2022. The aforementioned patent applications are incorporated herein by reference in their entirety.

TECHNICAL FIELD

This application relates to the technical field of batteries, and in particular, to a pole piece labeling control method and device, electronic equipment, and a storage medium.

BACKGROUND

In order to prevent a pole piece having defects from being involved in a cell and ensure the safety of the cell, it is necessary to detect the pole piece having defects.

In the process of pole piece rolling and slitting, a visual detection system is usually used to detect defects of the pole piece. In the case of detecting that the pole piece has defects, the pole piece is labeled, and then in the winding stage of the cell, label paper may be identified in advance, and the pole piece having defects is automatically identified and cut off.

However, due to the relative movement between a passing roller and the pole piece in the process of transmission movement of the pole piece, there is a deviation between the actual distance of the transmission movement of the pole piece and the pre-measured distance, which leads to a deviation of a labeling position, resulting in abnormal labeling.

SUMMARY

In view of the above problems, this application provides a pole piece labeling control method and device, electronic equipment, and a storage medium, which can solve the problem of abnormal labeling caused by the relative movement between the passing roller and the pole piece at present.

According to a first aspect, this application provides a pole piece labeling control method. The method includes: acquiring a pole piece image of a target pole piece, where the pole piece image includes a pole piece mark hole image; determining a defect detection result according to the pole piece image; determining a first distance according to the pole piece mark hole image, where the first distance characterizes a distance from a mark hole in the pole piece mark hole image to an image edge, close to a labeling position, of the pole piece mark hole image; determining a second distance according to the first distance, where the second distance includes a distance from the mark hole in the pole piece mark hole image to the labeling position; determining a labeling delay of the target pole piece according to the second distance; and controlling the labeling of the target pole piece according to the labeling delay and the defect detection result.

According to the pole piece labeling control method designed above, in this solution, the defect detection is carried out through the acquired pole piece image of the target pole piece, a defect detection result is determined, a first distance from a mark hole to an image edge, close to a labeling position, of the pole piece mark hole image is firstly determined through the acquired pole piece mark hole image of the target pole piece, and then a second distance from the mark hole in the pole piece mark hole image to the labeling position is calculated according to the first distance, so that the real-time position condition of the pole piece on the transfer of a compression roller is identified through the pole piece mark hole image, a labeling delay obtained through the calculation based on the second distance is less affected by the relative movement of the pole piece and the compression roller, the accuracy of the labeling delay is improved, and the labeling position based on the labeling delay is more accurate.

In an optional embodiment of the first aspect, the determining a second distance according to the first distance includes: acquiring a third distance between a first camera and the labeling position, where the first camera is a camera that shoots the pole piece image of the target pole piece; and determining the second distance according to the third distance and the first distance.

In an optional embodiment of the first aspect, the determining the second distance according to the third distance and the first distance includes: acquiring a length of the pole piece image; and determining the second distance according to the third distance, the first distance, and the length of the pole piece image. According to this embodiment, the second distance is determined based on the third distance, the first distance, and the length of the pole piece image, so that the second distance is determined more accurately, thereby improving the accuracy of the labeling delay.

In an optional embodiment of the first aspect, the determining the second distance according to the third distance, the first distance, and the length of the pole piece image includes: calculating the second distance L2 according to a first formula, where the first formula is:

$$L2 = L3 - 2 * L0 + L1;$$

where L1 is the first distance, L2 is the second distance, L3 is the third distance, L0 is the length distance of the pole piece image along the pole piece transporting direction, i.e., the length of the pole piece image, and the labeling delay is determined when the first camera completes the collection of the next image of the pole piece mark hole image. According to this embodiment, the labeling delay is generated when the first camera completes the collection of the next image of the pole piece mark hole image, so that the influence of the calculation process and the transmission process of the labeling delay on labeling is avoided, and the labeling accuracy is improved.

In an optional embodiment of the first aspect, the determining a labeling delay of the target pole piece according to the second distance includes: acquiring a camera frequency division parameter, a camera frequency multiplication parameter, and a visual detection precision; and determining the labeling delay of the target pole piece according to the second distance, the camera frequency division parameter, the camera frequency multiplication parameter, and the visual detection precision.

In an optional embodiment of the first aspect, the determining the labeling delay of the target pole piece according to the second distance, the camera frequency division parameter, the camera frequency multiplication parameter, and the visual detection precision includes: calculating the labeling delay X according to a second formula, where the second formula is:

$$X=(L2*U)/(P*M);$$

where L2 is the second distance, U is the camera frequency division parameter, M is the camera frequency multiplication parameter, and P is the visual detection precision.

In an optional embodiment of the first aspect, the controlling the labeling of the target pole piece according to the labeling delay and the defect detection result includes: if the defect detection result shows that the target pole piece has defects, controlling a labeling machine at the labeling position to label the target pole piece after the labeling delay, so that the target pole piece is cut according to the labeling in the winding stage of the cell.

In an optional embodiment of the first aspect, the determining a defect detection result according to the pole piece image includes: detecting whether a pole piece image having defects on the target pole piece is present in the pole piece images or not; if the pole pieces image having defects on the target pole piece is present in the pole piece images, determining whether the pole piece image having defects is a pole piece mark hole image or not; and if the pole piece image having defects is a pole piece mark hole image, determining the defect detection result of the target pole piece according to the defect position in the pole piece mark hole image. According to this embodiment, when the defects are located on the pole piece mark hole image, the defect detection result of the target pole piece is determined according to the defect position in the pole piece mark hole image, so that the accuracy of the defect detection of the target pole piece is improved.

In an optional embodiment of the first aspect, the determining the defect detection result of the target pole piece according to the defect position in the pole piece mark hole image includes: determining whether the distance from the defect position to a first edge of the pole piece mark hole image is greater than the distance from the mark hole to the first edge or not, where the first edge is an image edge, close to the laser, of the pole piece mark hole image; if it is determined that the distance from the defect position to the first edge of the pole piece mark hole image is greater than the distance from the mark hole to the first edge, generating a defect detection result that the target pole piece has no defects and the previous pole piece of the target pole piece has defects; and if it is determined that the distance from the defect position to the first edge of the pole piece mark hole image is not greater than the distance from the mark hole to the first edge, a defect detection result that the target pole piece has defects is generated. According to this embodiment, when the distance from the defect position to the first edge of the pole piece mark hole image is greater than the distance from the mark hole to the first edge, a defect detection result that the target pole piece has no defects and the previous pole piece of the target pole piece has defects is generated; and when the distance from the defect position to the first edge of the pole piece mark hole image is not greater than the distance from the mark hole to the first edge, a defect detection result that the target pole piece has defects is generated, so that the accuracy of the defect detection of the target pole piece is improved.

In an optional embodiment of the first aspect, after detecting whether a pole piece image having defects on the target pole piece is present in the pole piece images or not, the method further includes: generating a defect detection result that the target pole piece has no defects if it is determined that the pole piece image having defects on the target polar piece is not present in the pole piece images.

In an optional embodiment of the first aspect, after determining whether a pole piece image having defects is a pole piece mark hole image or not, the method further includes: generating a defect detection result that the target pole piece has defects if it is determined that the pole piece image having defects is not a pole piece mark hole image.

In an optional embodiment of the first aspect, the pole piece image is obtained by shooting the target pole piece by a plurality of cameras, each camera corresponds to one pole piece mark hole image, and the plurality of cameras are sequentially disposed between the laser and the labeling position; the determining a labeling delay of the target pole piece according to the pole piece mark hole image includes: determining a corresponding labeling delay according to the pole piece mark hole image of the current camera when the current camera obtains a corresponding pole piece mark hole image by shooting; and updating a last labeling delay according to a labeling delay corresponding to the current camera, where the last labeling delay is determined by the pole piece mark hole image shot by the last camera on the target pole piece, the last camera is adjacent to the current camera, the distance between the last camera and the laser is less than the distance between the current camera and the laser. According to this embodiment, a plurality of cameras are disposed between the laser and the labeling position, so that the position and the labeling delay of the target pole piece are updated for a plurality of times, thereby further improving the accuracy of labeling.

In an optional embodiment of the first aspect, the plurality of cameras include a slitting camera, and the slitting camera is a camera closest to the labeling position in the plurality of cameras; and a distance between the slitting camera and the labeling position is a preset distance.

In an optimal embodiment of the first aspect, the preset distance is determined by the length of a single picture shot by the slitting camera and a standby length; and the standby length is determined according to signal transmission and labeling machine response time.

According to a second aspect, this application provides a pole piece labeling control device. The pole piece labeling control device includes an acquisition module, a determination module and a control module. The acquisition module is configured to acquire a pole piece image of a target pole piece, where the pole piece image includes a pole piece mark hole image. The determination module is configured to determine a defect detection result according to the pole piece image, determine a first distance according to the pole piece mark hole image, where the first distance characterizes a distance from a mark hole in the pole piece mark hole image to an image edge, close to a labeling position, of the pole piece mark hole image, determines a second distance according to the first distance, where the second distance includes a distance from the mark hole in the pole piece mark hole image to the labeling position, and determines a labeling delay of the target pole piece according to the second distance. The control module is configured to control the labeling of the target pole piece according to the labeling delay and the defect detection result.

According to the pole piece labeling control device designed above, in this solution, the defect detection is carried out through the acquired pole piece image of the target pole piece, a defect detection result is determined, a first distance from a mark hole to an image edge, close to a labeling position, of the pole piece mark hole image is firstly determined through the acquired pole piece mark hole image of the target pole piece, and then a second distance from the mark hole in the pole piece mark hole image to the labeling position is calculated according to the first distance, so that the real-time position condition of the pole piece on the transfer of a compression roller is identified through the pole piece mark hole image, a labeling delay obtained through calculation based on the second distance is less affected by the relative movement of the pole piece and the compression roller, the accuracy of the labeling delay is improved, and the labeling position based on the labeling delay is more accurate.

In an optional embodiment of the second aspect, the determination module is further specifically configured to acquire a third distance between the first camera and the labeling position, where the first camera is a camera that shoots a pole piece image of the target pole piece, and determine a second distance according to the third distance and the first distance.

In an optional embodiment of the second aspect, the determination module is further specifically configured to acquire a length of the pole piece image, and determine a second distance according to the third distance, the first distance, and the length of the pole piece image.

In an optional implementation of the second aspect, the determination module is further specifically configured to calculate a second distance L2 according to a first formula, where the first formula is:

$$L2 = L3 - 2 * L0 + L1;$$

where L1 is the first distance, L2 is the second distance, L3 is the third distance, L0 is the length distance of the pole piece image along the pole piece transporting direction, i.e., the length of the pole piece image, and the labeling delay is determined when the first camera completes the collection of the next image of the pole piece mark hole image.

In an optional embodiment of the second aspect, the determination module is further specifically configured to acquire a camera frequency division parameter, a camera frequency multiplication parameter, and a visual detection precision, and determine a labeling delay of the target pole piece according to the second distance, the camera frequency division parameter, the camera frequency multiplication parameter, and the visual detection precision.

In an optional embodiment of the second aspect, the determination module is further specifically configured to calculate a labeling delay X according to a second formula, where the second formula is:

$$X = (L2 * U)/(P * M);$$

where L2 is the second distance, U is the camera frequency division parameter, M is the camera frequency multiplication parameter, and P is the visual detection precision.

In an optional embodiment of the second aspect, the control module is specifically configured to, if the defect detection result shows that the target pole piece has defects, control a labeling machine at the labeling position to label the target pole piece after a labeling delay, so that in the winding stage of the cell, the target pole piece is cut according to the labeling.

In an optional embodiment of the second aspect, the determination module is specifically configured to detect whether a pole piece image having defects on the target pole piece is present in the pole piece images or not. If the pole piece image having defects on the target pole piece is present in the pole piece images, the determination module determines whether a pole piece having defects is a pole piece mark hole image or not. If the pole piece image having defects is a pole piece mark hole image, the determination module determines a defect detection result of the target pole piece according to the defect position in the pole piece mark hole image.

In an optional implementation of the second aspect, the determination module is further specifically configured to determine whether a distance from the defect position to the first edge of the pole piece mark hole image is greater than a distance from the mark hole to the first edge or not, where the first edge is an image edge, close to a laser, of the pole piece mark hole image. If it is determined that the distance from the defect position to the first edge of the pole piece mark hole image is greater than the distance from the mark hole to the first edge, a defect detection result that the target pole piece has no defects and the previous pole piece of the target pole piece has defects is generated. If it is determined that the distance from the defect position to the first edge of the pole piece mark hole image is not greater than the distance from the mark hole to the first edge, a defect detection result that the target pole piece has defects is generated.

In an optional embodiment of the second aspect, the determination module is further specifically configured to, if it is determined that the pole piece image having defects on the target pole piece is not present in the pole piece images, generate a defect detection result that the target pole piece has no defects.

In an optional embodiment of the second aspect, the determination module is further specifically configured to, if it is determined that the pole piece image having defects is not a pole piece mark hole image, generate a defect detection result that the target pole piece has defects.

According to a third aspect, this application provides electronic equipment, including a memory and a processor. A computer program is stored in the memory. When the computer program is executed by the processor, the method in any one of optional embodiments of the first aspect and the second aspect is performed.

According to a fourth aspect, this application provides a computer-readable storage medium having a computer program stored thereon. When the computer program is executed by the processor, the method in any one of optional embodiments of the first aspect and the second aspect is performed.

According to a fifth aspect, this application provides a computer program product. When the computer program product runs on a computer, the computer performs the method in any one of optional embodiments of the first aspect and the second aspect.

The above description is only an overview of the technical solution of the embodiments of the utility model. In order to more clearly understand the technical means of the embodiments of the utility model, the implementation may be carried out according to the content of the description. In order to make the above and other purposes, features and advantages of the embodiments of the utility model more obvious and understandable, the following is a detailed description of embodiments of this utility model.

BRIEF DESCRIPTION OF DRAWINGS

Various other advantages and benefits will become apparent to those of ordinary skill in the art upon reading the following detailed description of the preferred embodiments. The drawings are only for the purpose of illustrating the preferred embodiments and are not to be construed as limiting this application. Also, like reference numerals are used to denote like parts throughout the drawings. In the drawings.

Figure 1:
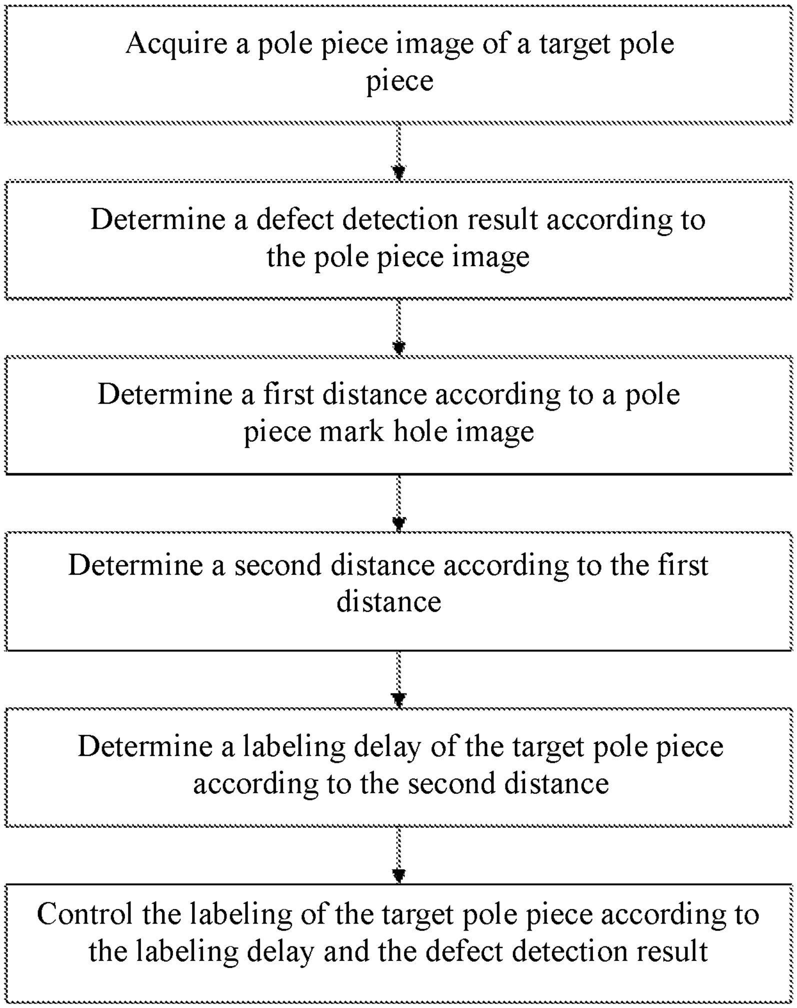
FIG. 1 is a schematic flow chart of a pole piece labeling control method according to an embodiment of this application.

Reference numerals in detailed description of embodiments are as follows:

A—pole piece;
B—passing roller;
C—laser;
D—slitting mechanism;
E1, E2—winding mechanism;
F1, F2—labeling machine;
G1—first camera;
G2—second camera;
N—Nth image;
N+1—N+1th image;
K—Kth pole piece;
K+1—K+1th pole piece;
Q1, Q2—mark hole;
P1—defect;
900—acquisition module;
910—determination module;
920—control module;
10—electronic equipment;
1001—processor;
1002—memory;
1003—communication bus.

DETAILED DESCRIPTION

Embodiments of the technical solution of this application will be described in detail below in conjunction with the accompanying drawings. The following embodiments are only used to illustrate the technical solution of this application more clearly, and therefore are only examples, rather than limiting the protection scope of this application.

Unless otherwise defined, all technical and scientific terms used herein have the same meaning as commonly understood by those skilled in the technical field of this application; the terms used herein are only for the purpose of describing specific embodiments, and are not intended to limit this application; and the terms "comprising" and "having" and any variations thereof in the specification and claims of this application and the description of the above drawings are intended to cover a non-exclusive inclusion.

In the description of the embodiments of this application, technical terms such as "first", "second" and the like are only used to distinguish different objects, and should not be understood as indicating or implying relative importance or implicitly indicating the number, specific order or primary-secondary relationship of the indicated technical features. In the description of the embodiments of this application, "a plurality of" means more than two, unless otherwise specifically defined.

Reference herein to an "embodiment" means that a particular feature, structure, or characteristic described in connection with the embodiment may be included in at least one embodiment of this application. The occurrences of this phrase in various places in the specification are not necessarily all referring to the same embodiment, nor are separate or alternative embodiments mutually exclusive of other embodiments. It is understood explicitly and implicitly by those skilled in the art that the embodiments described herein may be combined with other embodiments.

In the description of the embodiments of this application, the term "and/or" is only an association relationship describing associated objects, which means that there may be three relationships, such as A and/or B, which may mean: A is present, A and B are present at the same time, and B is present. In addition, the character "/" herein generally indicates that the contextual objects are an "or" relationship.

In the description of the embodiments of this application, the term "multiple" refers to more than two (including two), similarly, "multiple groups" refers to more than two groups (including two groups), and "multiple pieces" refers to more than two pieces (including two pieces).

In the description of the embodiments of this application, the technical terms "center", "longitudinal", "lateral", "length", "width", "thickness", "upper", "lower", "front", "rear", "left", "right", "vertical" "horizontal", "top", "bottom", "inner", "outer", "clockwise", "counterclockwise", "axial", "radial", "circumferential", etc. indicate the orientation or positional relationship based on the orientation or positional relationship shown in the drawings is only for the convenience of describing the embodiment of this application and simplifying the description, and are not intended to indicate or imply that the device or element referred to must have a specific orientation, be constructed and operated in a specific orientation, and therefore cannot be understood as limiting the embodiments of this application.

In the description of this embodiment of this application, unless otherwise clearly specified and defined, technical terms such as "installation", "connected", "connection" and "fixation" should be interpreted in a broad sense, for example, they may be a fixed connection, or a detachable connection, or integration, may also be a mechanical connection, or an electrical connection, may be a direct connection, or an indirect connection through an intermediate medium, and may be the internal communication of two components or the interaction relationship between two components. Those of ordinary skill in the art can understand the specific meanings of the above terms in this embodiment of this application according to specific situations.

In the field of new energy batteries, a battery cell is made by winding or folding a certain length of a pole piece and a separator. In order to prevent a pole piece having defects from being involved in a cell and ensure the safety of the cell, it is necessary to detect the pole piece having defects. In the process of pole piece rolling and slitting, a visual detection system is usually used to detect defects of the pole piece. In the case of detecting that the pole piece has defects, the pole piece is labeled, and then in the winding stage of the cell, label paper may be identified in advance, and the pole piece having defects is automatically identified and cut off.

The inventor noticed that, due to the relative movement between the passing roller and the pole piece in the process of transmission movement of the pole piece, there is a deviation between the actual distance of the transmission movement of the pole piece and the pre-measured distance, which leads to a deviation in the labeling position, resulting in abnormal labeling.

In view of the above problems, the inventor researched and designed a pole piece labeling control method and device, electronic equipment, and a storage medium. A defect detection result is determined through the pole piece image of the target pole piece. A first distance from a mark hole to an image edge, close to a labeling position, of the pole piece mark hole image is firstly determined through the acquired pole piece mark hole image of the target pole piece, and then a second distance from the mark hole in the pole piece mark hole image to the labeling position is calculated according to the first distance, so that the real-time position condition of the pole piece on the transfer of a compression roller is identified through the pole piece mark hole image, a labeling delay obtained through the calculation based on the second distance is less affected by the relative movement of the pole piece and the compression roller, the accuracy of the labeling delay is improved, and the labeling position based on the labeling delay is more accurate.

Based on the above ideas, this application provides a pole piece labeling control method. The pole piece labeling control method can be performed by a computing device. The computing device includes, but not limited to, computers, servers, controllers, chips, upper computers, etc., as shown in FIG. 1. The pole piece labeling control method may be implemented in the following ways.

Acquire a pole piece image of a target pole piece; determine a defect detection result according to the pole piece image; determine a first distance according to the pole piece mark hole image; determine a second distance according to the first distance; determine a labeling delay of the target pole piece according to the second distance; and control the labeling of the target pole piece according to the labeling delay and the defect detection result.

Figure 2:
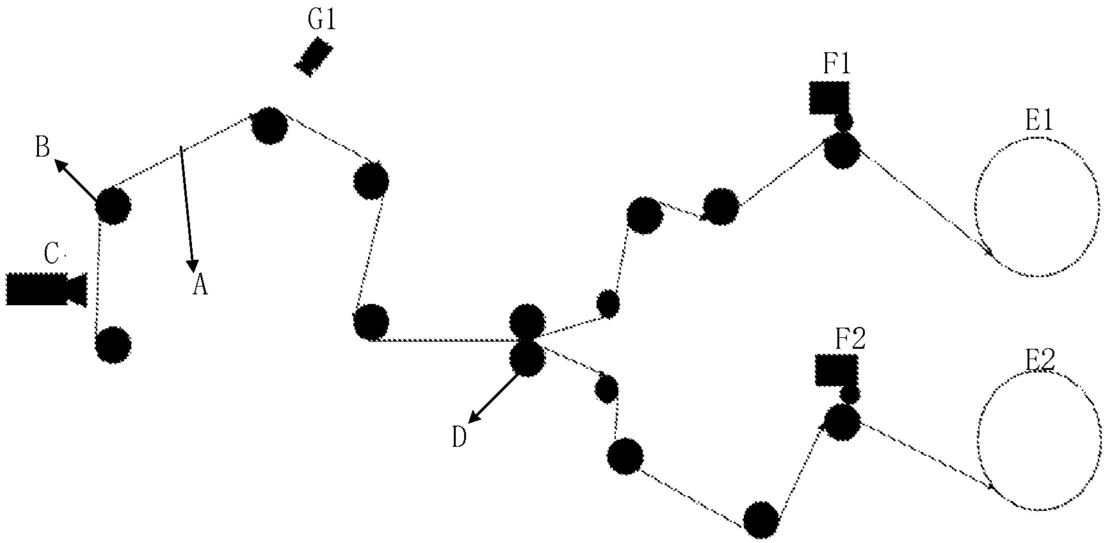
FIG. 2 is an example diagram of a scenario according to an embodiment of this application.

In the above embodiment, the target pole piece refers to a pole piece that needs defect detection at present, and determines whether to be labeled according to the defect detection result. In order to facilitate the understanding of this solution, the following specific implementation scenario is illustrated in this solution, as shown in FIG. 2. The pole piece A moves through the passing roller B, and then passes through the laser C and the slitting mechanism D for slitting, where the laser C will cut a mark hole on the pole piece every certain distance, and the length of the pole piece between the two mark holes on pole piece A is the length of one cell pole piece. Generally, the mark hole firstly cut out on the pole piece is used as the beginning of the current pole piece. For example, the pole piece A is a pole piece between the mark holes Q1 and Q2, and if the mark hole Q1 is cut out before Q2, the mark hole Q1 is considered to be the mark hole of the pole piece A, the corresponding pole piece may be identified according to each mark hole, and the slitting mechanism divides the pole piece A into two halves, where one half is wound by the winding mechanism E1, and the other half is wound by the winding mechanism E2.

In order to prevent the pole piece having defects from being wound or folded to form a cell, before the pole piece is wound, the pole piece may be subjected to defect detection and labeled accordingly, and then the labeling may characterize whether the pole piece has defects or not, so that pole pieces having defects may be cut. As a specific example, as shown in FIG. 2, in this solution, the labeling machine F1 may be disposed before the winding mechanism E1, and the labeling machine F2 is disposed before the winding mechanism E2, so that the pole pieces are labeled by the labeling machines F1 and F2.

On the basis of the implementation scenario of an example, the target pole piece described in this embodiment refers to the pole piece corresponding to the length of the pole piece between the two mark holes cut out by the laser C, and the pole piece image of the target pole piece may be acquired by shooting the moving target pole piece through the camera. Specifically, the pole piece image of the target pole piece may include an image of the whole section of the target pole piece from the mark hole cut out to the next mark hole. As a possible example, on the basis of the aforementioned implementation scenarios, in this solution, at least one camera is disposed between the laser C and the labeling machine F1/F2, as shown in FIG. 2. In this solution, the first camera G1 may be disposed. The target pole piece is shot by the first camera G1, so that the pole piece image of the target pole piece may be obtained, where the pole piece image may include the pole piece mark hole image of the target pole piece. According to the foregoing description, the mark hole at the beginning stage of the pole piece may identify the corresponding pole piece. On this basis, the pole piece mark hole image is the mark hole image at the beginning stage of the target pole piece. Of course, in addition to the pole piece mark hole image, the pole piece image may further include images of other positions of the target pole piece other than the mark hole.

It should be noted here that the above implementation scenario is only one of the scenarios illustrated for the convenience of understanding this solution, and the implementation scenario of this solution is not limited to the above one embodiment, and may also be any other scenario in the process of processing the cell pole piece.

On the basis of the above, in this solution, whether the target pole piece has defects or not is detected according to the obtained pole piece image of the target pole piece, and a defect detection result is determined. The defects of the pole piece may include, but are not limited to, defects such as foil leakage, particles, air bubbles, and pinholes in a coating area on the surface of the pole piece, defects such as pole piece bending, creasing, wrinkling, indentation, and dry cracking, and defects such as material dropping, notches, and cracks on the edges of the pole pieces. The defect detection result may be that the target pole piece has defects and the target pole piece has no defects. As a specific embodiment, in order to implement the rapid detection of the target pole piece, in this solution, the defect of the target pole piece is detected based on the pole piece image of the target pole piece through a pre-trained pole piece defect detection neural network model, so as to determine the defect detection result of the target pole piece.

Specifically, in order to accurately cut the target pole piece having defects, it is necessary to accurately label the mark hole at the beginning of the target pole piece, so that the whole section of pole piece is cut. If the labeling position deviates, the pole piece is caused to have residue, which affects other pole pieces. In the traditional way, after the laser C cuts out the mark hole on the target pole piece, the initial labeling delay is sent to the labeling machine. However, since there is a certain distance between the laser C and the labeling machine, at this distance, the pole piece and the compression roller move relative to each other, resulting in inaccurate labeling by the labeling machine based on the initial labeling delay.

Figure 3:
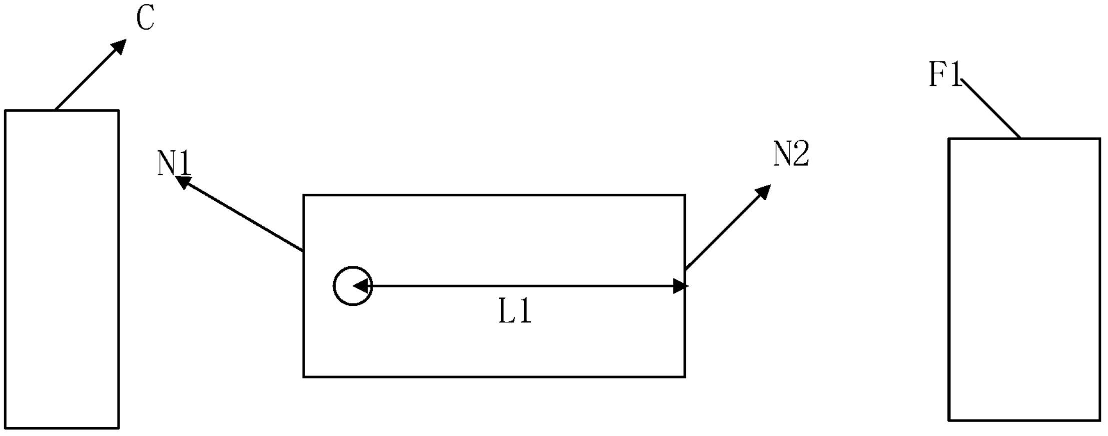
FIG. 3 is a schematic diagram of a pole piece mark hole image according to an embodiment of this application.

Based on this, in this solution, the first distance L1 is determined according to the pole piece mark hole image of the target pole piece. The first distance L1 characterizes the distance from the mark hole in the pole piece mark hole image to the image edge, close to the labeling position, of the target pole piece image. As an example, the pole piece mark hole image shown in FIG. 3 is used, and the edge of N2 of the image in the pole piece mark hole image is the edge of the image close to the labeling position. The first distance L1 is the distance from the mark hole to the edge of N2. Optionally, the first distance L1 may include the distance from an end point, close to the side of N2, of the mark hole to the edge of N2, or the distance from the center point of the mark hole to the edge of N2, or the distance from any point on the mark hole to the edge of N2, which is not defined in this embodiment of this application. Optionally, the distance between the mark hole and the edge of N2 may be the vertical distance from any point in the mark hole to the edge of N2, or the straight-line distance from any point in the mark hole to any point on the edge of N2, which is not defined in this embodiment of this application.

On the basis of determining the first distance L1, in this solution, the second distance L2 is determined according to the first distance L1. The second distance L2 characterizes the distance from the mark hole of the target pole piece in the pole piece mark hole image to the labeling position. For example, according to the distance from the mark hole of the target pole piece to the labeling machine F1 in the scenario in FIG. 2 and the second distance L2, the labeling delay of the target pole piece is determined. Optionally, the second distance L2 may be the distance from any point on the mark hole to the labeling position, which is not defined in this embodiment. Optionally, the selected point position for determining the second distance L2 on the mark hole may be consistent with the selected point position for determining the first distance L1, which is not defined in this embodiment of this application.

The labeling delay may be a delay time length, which means that the labeling will be performed after the delay time length from the current time. In this solution, a camera is disposed between the laser and the labeling position, and the pole piece image of the target pole piece is acquired by the camera. Then, based on the pole piece mark hole image acquired by the camera, the first distance from the mark hole to the image edge, close to the labeling position, of the pole piece mark hole image is firstly determined, and then the second distance from the mark hole in the pole piece mark hole image to the labeling position is calculated according to the first distance, so that the real-time position condition of the pole piece on the transfer of a compression roller is identified through the pole piece mark hole image, a labeling delay obtained through the calculation based on the second distance is less affected by the relative movement of the pole piece and the compression roller, the accuracy of the labeling delay is improved, and the labeling position based on the labeling delay is more accurate.

In the case of the defect detection result and labeling delay obtained above, in this solution, the labeling of the target pole piece is controlled according to the labeling delay and the defect detection result. For example, assuming that a pole piece having defects needs to be labeled, the labeled pole piece is cut by a subsequent process. On this basis, if the identified defect detection result shows that the target pole piece has defects, the target pole piece will be labeled after the labeling delay. If the identified defect detection result has no defects, the target pole piece will not be labeled after the labeling delay.

According to the pole piece labeling control method designed above, in this solution, the defect detection is carried out through the acquired pole piece image of the target pole piece, a defect detection result is determined, a first distance from a mark hole to an image edge, close to a labeling position, of the pole piece mark hole image is firstly determined through the acquired pole piece mark hole image of the target pole piece, and then a second distance from the mark hole in the pole piece mark hole image to the labeling position is calculated according to the first distance, so that the real-time position condition of the pole piece on the transfer of a compression roller is identified through the pole piece mark hole image, a labeling delay obtained through the calculation based on the second distance is less affected by the relative movement of the pole piece and the compression roller, the accuracy of the labeling delay is improved, and the labeling position based on the labeling delay is more accurate.

In an optional implementation of this embodiment, as a possible implementation, for the determination of the second distance according to the first distance described above, in this solution, a third distance L3 between the first camera that captures the pole piece image of the target pole piece and the labeling position may be firstly acquired, and then the second distance L2 is determined according to the third distance L3 and the first distance L1. Since the first camera is fixed, and the position of the labeling machine at the labeling position is also fixed, the distance between the first camera and the labeling position, that is, the third distance L3, is a fixed value. Optionally, the third distance L3 may be measured in advance, and then pre-stored in the computing device. The third distance may be called directly when the first distance L1 is calculated, which is not defined in this embodiment of this application.

Specifically, in this solution, the length L0 of the pole piece image may be acquired, and the second distance L2 is determined according to the third distance L3, the first distance L1 and the length L0 of the pole piece image. As a possible implementation, in this solution, during the calculation of the labeling delay and the transmission process of the labeling delay, the target pole piece also moves on the compression roller at the same time. Therefore, in this solution, the labeling delay is generated when the first camera completes the collection of the next pole piece image of the pole piece mark hole image, thereby reducing the influence of the calculation process and transmission time on the labeling time. On this basis, in this scheme, the second distance L2 is calculated according to the first formula, where the first formula is:

$$L2 = L3 - 2 * L0 + L1;$$

wherein L1 is the first distance, L2 is the second distance, L3 is the third distance, and L0 is the length distance of the pole piece image along the pole piece transporting direction, i.e., the length of the pole piece image.

Figure 4:
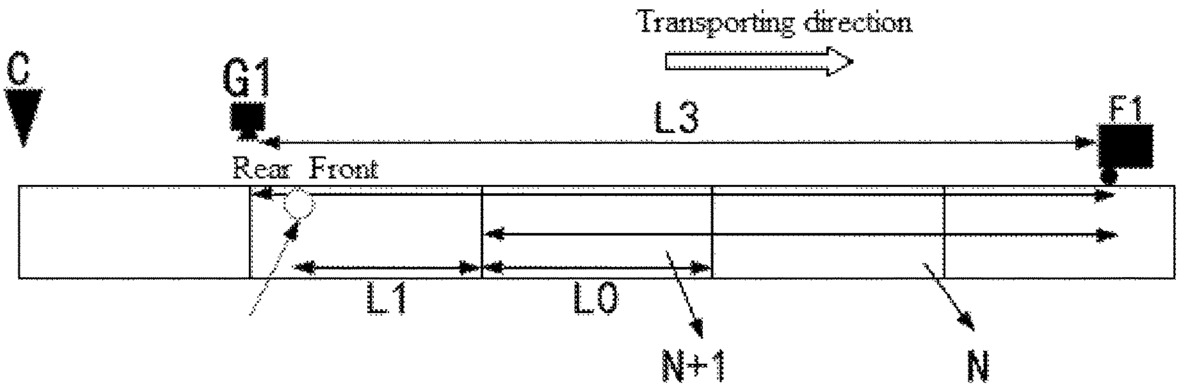
FIG. 4 is a schematic diagram of a distance between a mark hole and a labeling position according to an embodiment of this application.

The above calculation process may be represented by the algorithm model shown in FIG. 4. In FIG. 4, L1 is the first distance from the mark hole of the target pole piece to the image edge, close to the labeling position, of the pole piece mark hole image, L0 is the length distance of the pole piece image along the pole piece transporting direction, L3 is the distance between the first camera and the labeling position, N represents the Nth image obtained by shooting, and N+1 represents the N+1th image obtained by shooting.

As another possible implementation, when the calculation process is fast enough, in this solution, the labeling delay is generated when the first camera completes the collection of the pole piece mark hole image. On this basis, in this solution, the second distance L2 may be calculated according to the following formula, which is:

$$L2 = L3 - L0 + L1;$$

wherein L1 is the first distance, L2 is the second distance, L3 is the third distance, and L0 is the length distance of the pole piece image along the pole piece transporting direction, i.e., the length of the pole piece image.

On the basis of obtaining the second distance L2 through calculation by the above method, it is assumed that in this solution, a labeling signal is sent to the labeling machine according to the pulse of an encoder. On this basis, in this solution, the camera frequency division parameter, the camera frequency multiplication parameter and the visual detection precision may be acquired, and then the labeling delay is calculated according to the calculated first distance, the camera frequency division parameter, the camera frequency multiplication parameter and the visual detection precision, so that the encoder may wait for the labeling delay and then send pulses to the labeling machine to label the labeling machine.

Specifically, in this solution, the labeling delay X may be calculated according to the second formula, where the second formula is:

$$X = (L2 * U)/(P * M);$$

where L2 is the first distance, U is the camera frequency division parameter, M is the camera frequency multiplication parameter, and P is the visual detection precision.

As a possible embodiment, in this solution, when the laser has completed the forming of mark holes for the target pole piece, the laser has already sent an initial labeling delay to the encoder. On this basis, in this solution, the initial labeling delay may be updated based on the calculated labeling delay.

Figure 5:
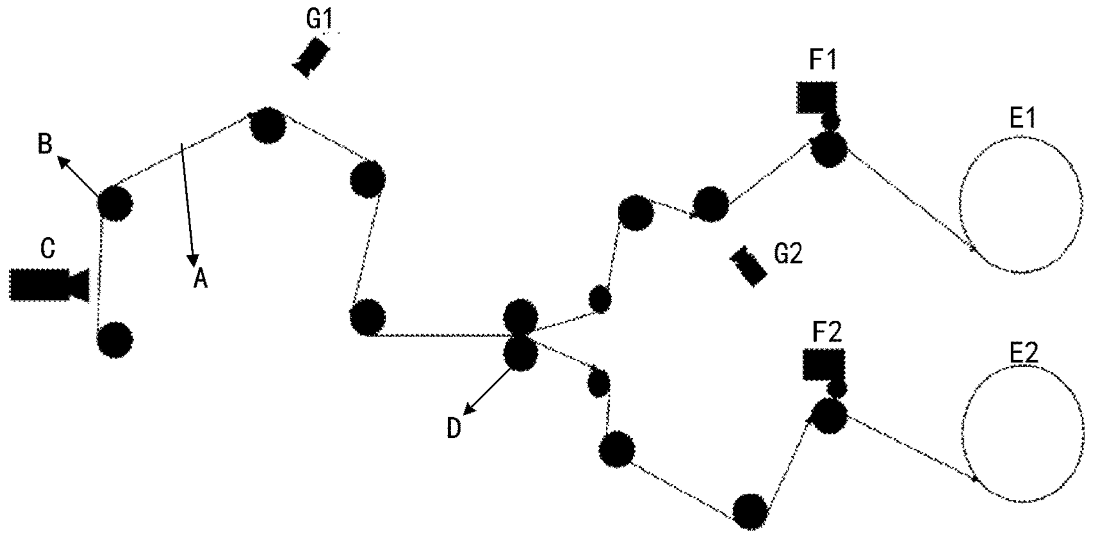
FIG. 5 is another example diagram of a scenario according to an embodiment of this application.
Figure 6:
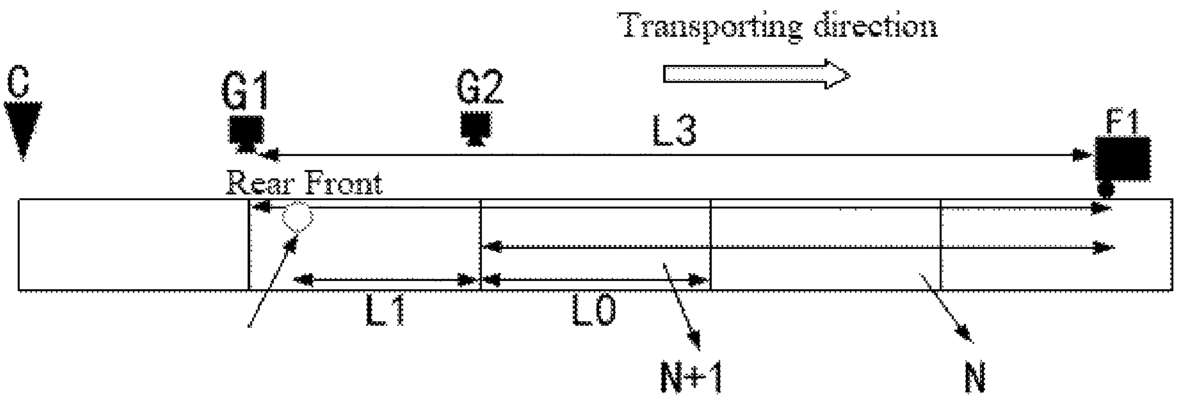
FIG. 6 is another schematic diagram of a distance between a mark hole and a labeling position according to an embodiment of this application.

As yet another possible embodiment, in this solution, multiple cameras may be disposed between the laser and the labeling position, which may be specifically shown in the example scenarios shown in FIGS. 5 and 6. The multiple cameras are sequentially disposed between the laser and the labeling machine F1/F2. On this basis, the target pole piece will pass through the multiple cameras in sequence during the movement, that is, each camera will shoot the target pole piece, so as to obtain the pole piece image corresponding to the target pole piece. Therefore, when each camera shoots the pole piece mark hole image of the target pole piece, it can identify the distance between the pole piece mark hole of the target pole piece and the labeling position in the aforementioned manner according to the corresponding pole piece mark hole image, so as to calculate the corresponding labeling delay when the mark hole of the target pole piece passes through the camera to update the last labeling delay. For example, as shown in FIG. 5, the second camera G2 is adjacent to the first camera G1. When passing through the first camera G1, the mark hole of the target pole piece is shot by the first camera G1. According to the pole piece mark hole image of the target pole piece shot by the first camera G1, the labeling delay corresponding to the first camera G1 may be calculated, and then the target pole piece continues to move under the compression roller. When the mark hole of the target pole piece passes through the second camera G2, the second camera G2 may shoot the pole piece mark hole image of the target pole piece, and then the labeling delay corresponding to the second camera G2 may be calculated. In order to prevent inaccurate labeling caused by relative movement between the pole piece and the compression roller between the first camera G1 and the second camera G2, according to this solution, the labeling delay corresponding to the first camera is updated according to the labeling delay corresponding to the second camera G2, so that the labeling delay is more accurate.

It should be noted here that, when there are multiple cameras, the manner in which each camera determines the corresponding labeling delay is the same as the manner in which the first camera G1 determines the labeling delay, which is not described here.

In an optional implementation of this embodiment, on the basis of using multiple cameras, the multiple cameras may include a slitting camera, for example, the second camera G2 is a slitting camera, the slitting camera is a camera closest to the labeling position in the multiple cameras, the slitting camera shoots the slit pole piece, and on this basis, the distance between the slitting camera and the labeling position is the preset distance. The preset distance is determined by the length of a single picture shot by the slitting camera and the standby length. The standby length is determined according to the signal transmission and labeling machine response time. The length of the single picture is obtained by multiplying the single-pixel precision and the row pixels of the image captured by the slitting camera.

The preset distance may be calculated in the following way, where preset distance=single picture length*2+standby length. The preset distance is explained with the following examples.

A die-cutting and slitting all-in-one machine needs to label at M1 (mm) in front of the mark hole. The picture collected by the visual detection system is composed of T rows of pixels. The single-pixel precision is Y1 (mm/pixel). The signal transmission and labeling machine response time is calculated in Z1 (ms). The maximum operating speed of the die-cutting and slitting machine is Vmax mm/min. Then the preset distance may be calculated as:

$$\text{preset distance} = Y1*T*2+M1+Z1*V\max = Y1*2T+M1+V\max*Z1(\text{mm}).$$

In an optional embodiment of this embodiment, the mark hole at the beginning of the pole piece described above characterizes the corresponding pole piece. On this basis, in order to make the labeling accurate, it is necessary to distinguish the positional relationship between the defect and the mark hole, and different positional relationships produce different defect identification results. Therefore, for step S110, in this solution, whether a pole piece image having defects on the target pole piece is present in the pole piece images or not may be firstly detected. If the pole piece image having defects is not present in the pole piece images, it is considered that the target pole piece has no defects.

If a pole piece image having defects is present in the pole piece images, it is determined whether the image having defects is a pole piece mark hole image or not. If the pole piece image having defects is not a pole piece mark hole image, it indicates that a pole piece segment of the target pole piece has defects, thereby generating a defect detection result that the target pole piece has defects.

If the pole piece image having defects is the pole piece mark hole image, the defect detection result of the target pole piece is further determined according to the defect position in the pole piece mark hole image.

As a possible embodiment, in this solution, whether the distance from a defect position to a first edge of the pole piece mark hole image is greater than a distance from a mark hole to the first edge or not may be firstly determined, where the first edge is an image edge, close to a laser, of the pole piece mark hole image, for example, the edge of N1 in FIG. 3. If it is determined that the distance from the defect position to the first edge of the pole piece mark hole image is greater than the distance from the mark hole to the first edge, it indicates that the defect is behind the mark hole of the target pole piece, thereby generating a defect detection result that the target pole piece have no defects and the previous pole piece of the target pole piece has defects. If the distance from the defect position to the first edge of the pole piece mark hole image is not greater than the distance from the mark hole to the first edge, it indicates that the defect is on the target pole piece, thereby generating a defect detection result that the target pole piece has defects.

Figure 7:
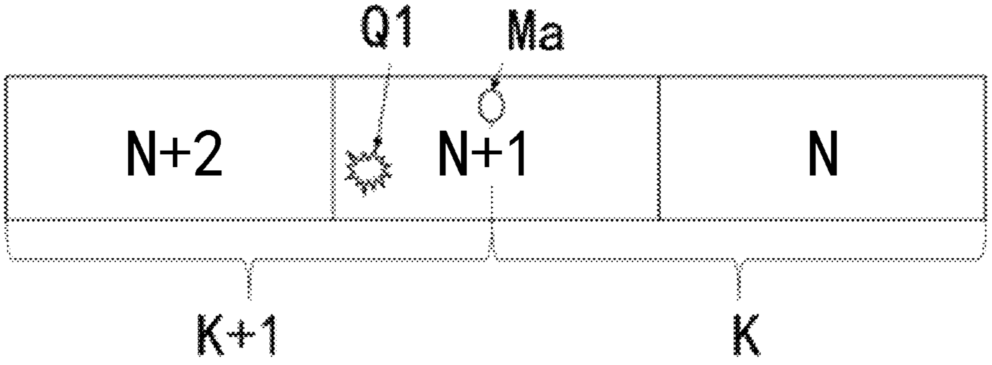
FIG. 7 is a schematic diagram of a defect position on a pole piece mark hole image according to an embodiment of this application.
Figure 8:
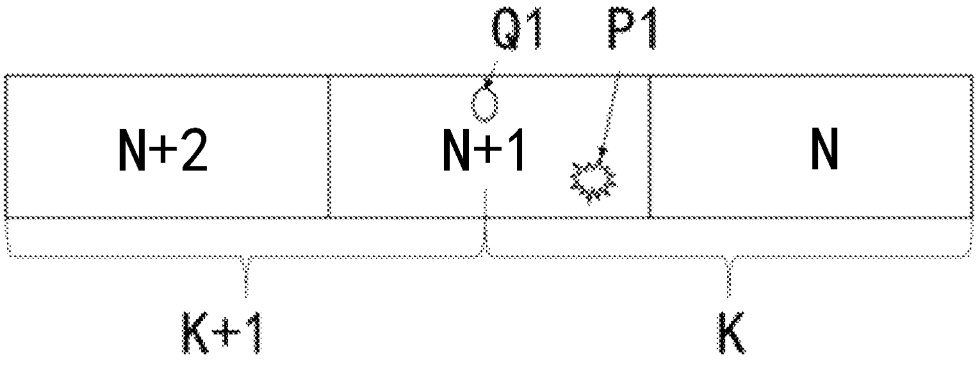
FIG. 8 is another schematic diagram of a defect position on a pole piece mark hole image according to an embodiment of this application.

As a possible example, as shown in FIG. 7 and FIG. 8, K represents the Kth pole piece, K+1 represents the (K+1)th pole piece, Q1 represents the mark hole, and P1 represents the defect. FIG. 7 is a schematic diagram of a defect P1 before a mark hole Q1 (the distance from the defect position to the first edge of the pole piece mark hole image is not greater than the distance from the mark hole to the first edge). FIG. 8 is a schematic diagram of a defect P1 after a mark hole Q1 (the distance from the defect position to the first edge of the pole piece mark hole image is greater than the distance from the mark hole to the first edge), so that based on the above method, it can be concluded that a defect detection result that the target pole piece has defects may be obtained based on FIG. 7, and a defect detection result that the target pole piece has no defects and the previous pole piece of the target pole piece has defects is obtained based on FIG. 8.

In addition, it should be noted here that when multiple cameras are configured to shoot, the multiple cameras set in this solution may respectively shoot the front and back of the pole piece, so as to summarize the image detection results of all cameras to determine whether the target pole piece has defects or not. For example, in FIG. 5, the first camera G1 and the second camera G2 respectively shoot different faces of the target pole piece. On this basis, in this solution, a defect detection result that whether the target pole piece has defects or not is identified based on the pole piece image shot by the first camera G1, and a defect detection result that whether the target pole piece has defects or not is identified based on the pole piece image shot by the second camera G2, and then whether the target pole piece has defects or not is determined by the defect detection results of the first camera G1 and the second camera G2.

Figure 9:
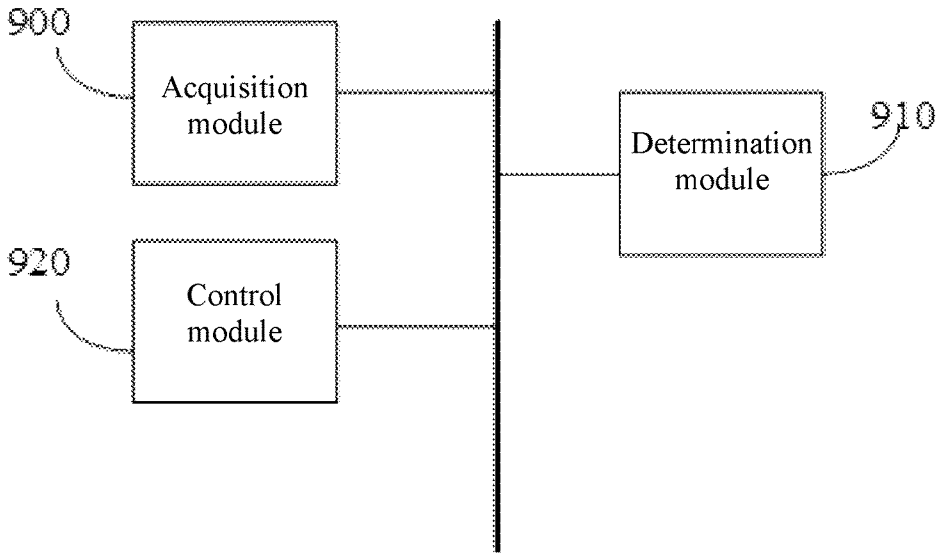
FIG. 9 is a schematic structural diagram of a pole piece labeling control device according to an embodiment of this application.

FIG. 9 shows a schematic structural block diagram of a pole piece labeling control device provided by this application. It should be understood that the device corresponds to the embodiments of the method performed in FIG. 1 and FIG. 8, and can perform the steps involved in the aforementioned methods. For specific functions of the device, reference may be made to the above description to avoid repetition, and detailed descriptions are appropriately omitted here. The device includes at least one software function module that can be stored in a memory in the form of software or firmware or solidified in an operating system (OS) of the device. Specifically, the device includes: an acquisition module 900, a determination module 910 and a control module 920. The acquisition module 900 is configured to acquire a pole piece image of a target pole piece, where the pole piece image includes a pole piece mark hole image. The determination module 910 is configured to determine a defect detection result according to the pole piece image, determine a first distance according to the pole piece mark hole image, where the first distance characterizes a distance from a mark hole in the pole piece mark hole image to an image edge, close to a labeling position, of the pole piece mark hole image, determine a second distance according to the first distance, where the second distance includes a distance from the mark hole in the pole piece mark hole image to the labeling position, and determine a labeling delay of the target pole piece according to the second distance. The control module 920 is configured to control the labeling of the target pole piece according to the labeling delay and the defect detection result.

According to the pole piece labeling control device designed above, in this solution, the defect detection is carried out through the acquired pole piece image of the target pole piece, a defect detection result is determined, a first distance from a mark hole to an image edge, close to a labeling position, of the pole piece mark hole image is firstly determined through the acquired pole piece mark hole image of the target pole piece, and then a second distance from the mark hole in the pole piece mark hole image to the labeling position is calculated according to the first distance, so that the real-time position condition of the pole piece on the transfer of a compression roller is identified through the pole piece mark hole image, a labeling delay obtained through calculation based on the second distance is less affected by the relative movement of the pole piece and the compression roller, the accuracy of the labeling delay is improved, and the labeling position based on the labeling delay is more accurate.

According to some embodiments of this application, the determination module 910 is further specifically configured to acquire a third distance between the first camera and the labeling position, where the first camera is a camera that shoots multiple pole piece images of the target pole piece, and determine the second distance according to the third distance and the first distance.

According to some embodiments of this application, the determination module 910 is further specifically configured to acquire a length of the pole piece image, and determine the second distance according to the third distance, the first distance, and the length of the pole piece image.

According to some embodiments of this application, the determination module 910 is further specifically configured to calculate a second distance L2 according to a first formula, where the first formula is:

$$L2 = L3 - 2*L0 + L1;$$

where L1 is the first distance, L2 is the second distance, L3 is the third distance, L0 is the length of the pole piece image, and the labeling delay is determined when the first camera completes the collection of the next image of the pole piece mark hole image.

According to some embodiments of this application, the determination module 910 is further specifically configured to acquire a camera frequency division parameter, a camera frequency multiplication parameter, and visual detection precision, and determine a labeling delay of the target pole piece according to the second distance, the camera frequency division parameter, the camera frequency multiplication parameter, and the visual detection precision.

According to some embodiments of this application, the determination module 910 is further specifically configured to calculate the labeling delay X through a second formula, where the second formula is:

$$X = (L2*U)/(P*M);$$

where L2 is the second distance, U is the camera frequency division parameter, M is the camera frequency multiplication parameter, and P is the visual detection precision.

According to some embodiments of this application, the control module 920 is specifically configured to, if the defect detection result shows that the target pole piece has defects, control a labeling machine at the labeling position to label the target pole piece after the labeling delay, so that in the winding stage of the cell, the target pole piece is cut according to the labeling.

According to some embodiments of this application, the determination module 910 is specifically configured to detect whether a pole piece image having defects on the target pole piece is present in the pole piece images or not. If the pole piece image having defects on the target pole piece is present in the pole piece images, the determination module 910 determines whether a pole piece image having defects is a pole piece mark hole image or not. If the pole piece image having defects is a pole piece mark hole image, the determination module 910 determines a defect detection result of the target pole piece according to the defect position in the pole piece mark hole image.

According to some embodiments of this application, the determination module 910 is further specifically configured to determine whether a distance from the defect position to the first edge of the pole piece mark hole image is greater than a distance from the mark hole to the first edge or not, where the first edge is an image edge, close to a laser, of the pole piece mark hole image. If it is determined that the distance from the defect position to the first edge of the image of the pole piece mark hole is greater than the distance from the mark hole to the first edge, a defect detection result that the target pole piece has no defects and the previous pole piece of the target pole piece has defects is generated. If it is determined that the distance from the defect position to the first edge of the image of the pole piece mark hole is not greater than the distance from the mark hole to the first edge, a defect detection result that the target pole piece has defects is generated.

According to some embodiments of this application, the determining module 910 is further specifically configured to, if it is determined that a pole piece image having defects on the target pole piece is not present in the pole piece images, generate a defect detection result that the target pole piece have no defects.

According to some embodiments of this application, the determination module 910 is further specifically configured to, if it is determined that the pole piece image having defects is not a pole piece mark hole image, generate a defect detection result that the target pole piece has defects.

Figure 10:
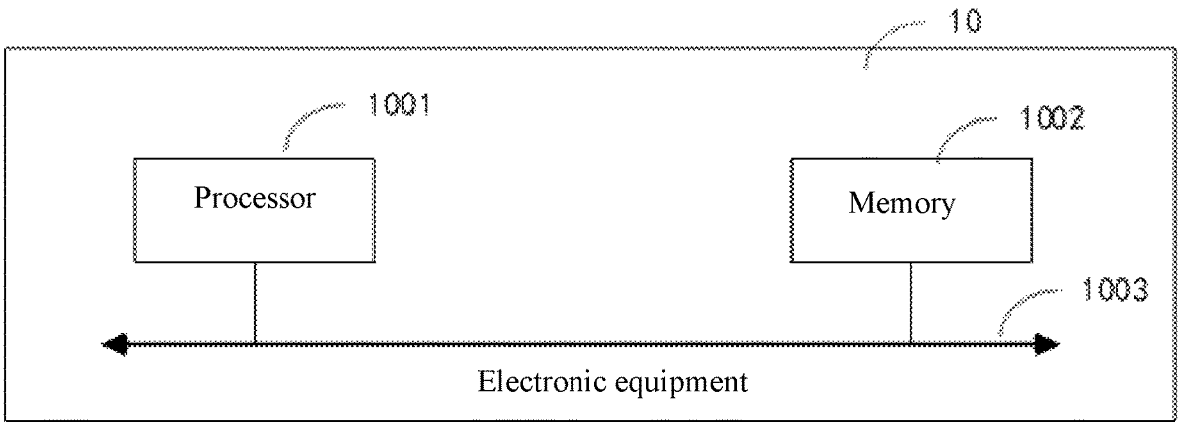
FIG. 10 is a schematic structural diagram of electronic equipment according to an embodiment of this application.

According to some embodiments of this application, as shown in FIG. 10, this application provides electronic equipment 10, including: a processor 1001 and a memory 1002. The processor 1001 and the memory 1002 are interconnected and communicate with each other through a communication bus 1003 and/or other forms of connection mechanisms (not shown). The memory 1002 stores a computer program executable by the processor 1001. When the computing device is running, the processor 1001 executes the computer program, so as to perform the method performed in the foregoing implementations during execution. For example, step S100 to step S150: acquiring a pole piece image of the target pole piece; determining a defect detection result according to the pole piece image; determining a first distance according to the pole piece mark hole image; determining a second distance according to the first distance; determining a labeling delay of the target pole piece according to the second distance; and controlling the labeling of the target pole piece according to the labeling delay and the defect detection result.

This application provides a computer-readable storage medium having a computer program stored thereon. When the computer program is executed by a processor, the aforementioned method is performed.

The storage medium can be implemented by any type of volatile or non-volatile storage device or their combination, such as static random access memory (SRAM), electrically erasable programmable read-only memory (EEPROM), erasable programmable read only memory (EPROM), programmable read-only memory (PROM), read-only memory (ROM), magnetic memory, flash memory, magnetic disk or optical disk.

This application provides a computer program product. When the computer program product runs on a computer, the computer performs the aforementioned method.

Finally, it should be noted that: the above embodiments are only used to illustrate the technical solutions of this application, and are not intended to limit it; although this application has been described in detail with reference to the foregoing embodiments, those ordinary skill in the art should understand that: it is still possible to modify the technical solutions recorded in the foregoing embodiments, or perform equivalent replacements for some or all of the technical features; and these modifications or replacements do not make the essence of the corresponding technical solutions deviate from the scope of the technical solutions of the various embodiments of this application, and shall be included in the scope of the claims and specification of the present application. In particular, as long as there is no structural conflict, the technical features mentioned in the various embodiments may be combined in any manner. This application is not limited to the specific embodiments disclosed herein, but includes all technical solutions falling within the scope of the claims.

What is claimed is:

1. A method for pole piece labeling control, comprising:

acquiring pole piece images of a target pole piece moving at a constant speed, wherein the pole piece images include a pole piece mark hole image;

detecting defects on the target pole piece according to the acquired pole piece images, and obtaining a defect detection result;

when the defect detection result indicates that the target pole piece has a defect, determining a first distance according to the pole piece mark hole image, wherein the first distance is a distance from a mark hole in the pole piece mark hole image to an image edge, close to a labeling position, of the pole piece mark hole image;

determining a second distance according to the first distance, wherein the second distance is a distance from the mark hole in the pole piece mark hole image to the labeling position;

determining a labeling delay of the target pole piece, wherein the labeling delay is a delay time length; and labeling the target pole piece after the labeling delay;

wherein determining the labeling delay of the target pole piece comprises:

acquiring a camera frequency division parameter, a camera frequency multiplication parameter, and a visual detection precision; and determining the labeling delay of the target pole piece according to the second distance the camera frequency division parameter, the camera frequency multiplication parameter, and the visual detection precision.

2. The method according to claim 1, wherein determining the second distance according to the first distance comprises:

acquiring a third distance between a first camera and the labeling position, wherein the first camera is a camera that shoots the pole piece image of the target pole piece; and determining the second distance according to the third distance and the first distance.

3. The method according to claim 2, wherein determining the second distance according to the third distance and the first distance comprises:

acquiring a length of the pole piece image; and determining the second distance according to the third distance, the first distance, and the length of the pole piece image.

4. The method according to claim 3, wherein determining the second distance according to the third distance, the first distance, and the length of the pole piece image comprises:

calculating the second distance L2 according to a first formula, wherein the first formula is:

$$L2 = L3 - 2 * L0 + L1,$$

wherein L1 is the first distance, L2 is the second distance, L3 is the third distance, L0 is a length distance of the pole piece image in a pole piece transporting direction, and the labeling delay is generated when the first camera completes collection of a next image of the pole piece mark hole image.

5. The method according to claim 1, wherein determining the labeling delay of the target pole piece according to the second distance, the camera frequency division parameter, the camera frequency multiplication parameter, and the visual detection precision comprises:

calculating the labeling delay X according to a second formula, wherein the second formula is:

$$X = (L2 * U)/(P * M),$$

wherein L2 is the second distance, U is the camera frequency division parameter, M is the camera frequency multiplication parameter, and P is the visual detection precision.

6. The method according to claim 1, wherein labeling the target pole piece according to the labeling delay comprises:

controlling a labeling machine at the labeling position to label the target pole piece after the labeling delay, so that the target pole piece is cut according to the labeling in a winding stage of a cell.

7. The method according to claim 1, wherein detecting defects on the target pole piece according to the acquired pole piece images and obtaining the detection result comprises:

determining whether a pole piece image showing a defect on the target pole piece is present among the acquired pole piece images;

based on a determination that the pole piece image showing the defect on the target pole piece is present among the pole piece images, determining whether the pole piece image showing the defect on the target pole piece is the pole piece mark hole image; and based on a determination that the pole piece image showing the defect on the target pole piece is the pole piece mark hole image, generating the defect detection result according to a defect position of the defect in the pole piece mark hole image.

8. The method according to claim 7, wherein determining the defect detection result according to the defect position of the defect in the pole piece mark hole image comprises:

determining whether a distance from the defect position to a first edge of the pole piece mark hole image is greater than a distance from the mark hole to the first edge, wherein the first edge is an image edge, close to a laser, of the pole piece mark hole image;

based on a determination that the distance from the defect position to the first edge of the pole piece mark hole image is greater than the distance from the mark hole to the first edge, generating a defect detection result that the target pole piece has no defect and a previous pole piece of the target pole piece has a defect; and based on a determination that the distance from the defect position to the first edge of the pole piece mark hole image is not greater than the distance from the mark hole to the first edge, generating a defect detection result that the target pole piece has a defect.

9. The method according to claim 7, wherein after determining whether the pole piece image showing a defect on the target pole piece is present among the pole piece images, the method further comprises:

based on a determination that the pole piece image showing a defect on the target polar piece is not present among the pole piece images, generating a defect detection result that the target pole piece has no defect.

10. The method according to claim 7, wherein after determining whether the pole piece image showing the defect on the target pole piece is the pole piece mark hole image, the method further comprises:

based on a determination that the pole piece image shown the defect on the target pole piece is not the pole piece mark hole image, generating a defect detection result that the target pole piece has a defect.

11. The method according to claim 1, wherein the pole piece images are obtained by shooting the target pole piece by a plurality of cameras, each camera corresponds to one pole piece mark hole image, and the plurality of cameras are sequentially disposed between a laser and the labeling position; and wherein determining the labeling delay of the target pole piece comprises:

determining a corresponding labeling delay according to the pole piece mark hole image of a current camera when the corresponding pole piece mark hole image is obtained through shooting by the current camera; and updating a previous labeling delay according to the labeling delay corresponding to the current camera, wherein the previous labeling delay is determined by the pole piece mark hole image shot by a previous camera on the target pole piece, the previous camera is a camera adjacent to the current camera, and a distance between the previous camera and the laser is less than that between the current camera and the laser.

12. The method according to claim 11, wherein the plurality of cameras comprises a slitting camera, and the slitting camera is a camera closest to the labeling position in the plurality of cameras; and a distance between the slitting camera and the labeling position is a preset distance.

13. The method according to claim 12, wherein the preset distance is determined by a length of a single picture shot by the slitting camera and a standby length; and the standby length is determined according to signal transmission and response time of a labeling machine.

14. Electronic equipment, comprising:

a memory and a processor, wherein the memory stores a computer program, and when the computer program is executed by the processor, the equipment performs a process of pole piece labeling control that comprises:

acquiring pole piece images of a target pole piece moving at a constant speed, wherein the pole piece images include a pole piece mark hole image;

detecting defects on the target pole piece according to the pole piece images and obtaining a defect detection result;

when the defect detection result indicates that the target pole piece has a defect, determining a first distance according to the pole piece mark hole image, wherein the first distance is a distance from a mark hole in the pole piece mark hole image to an image edge, close to a labeling position, of the pole piece mark hole image;

determining a second distance according to the first distance, wherein the second distance is a distance from the mark hole in the pole piece mark hole image to the labeling position;

determining a labeling delay of the target pole piece; and controlling labeling of the target pole piece after the labeling delay;

wherein determining the labeling delay of the target pole piece comprises:

acquiring a camera frequency division parameter, a camera frequency multiplication parameter, and a visual detection precision; and determining the labeling delay of the target pole piece according to the second distance, the camera frequency division parameter, the camera frequency multiplication parameter, and the visual detection precision.

15. A non-transitory computer-readable storage medium storing a computer program thereon for execution by a processor, wherein the computer program comprises instructions for pole piece labeling control, and the instructions comprise:

instructions for acquiring pole piece images of a target pole piece, wherein the pole piece images include a pole piece mark hole image;

instructions for detecting defects on the target pole piece according to the pole piece images, and obtaining a defect detection result;

instructions for, when the defect detection result indicates that the target pole piece has a defect, determining a first distance according to the pole piece mark hole image, wherein the first distance is a distance from a mark hole in the pole piece mark hole image to an image edge, close to a labeling position, of the pole piece mark hole image;

instructions for determining a second distance according to the first distance, wherein the second distance is a distance from the mark hole in the pole piece mark hole image to the labeling position;

instructions for determining a labeling delay of the target pole piece; and instructions for controlling labeling of the target pole piece after the labeling delay;

wherein determining the labeling delay of the target pole piece comprises:

acquiring a camera frequency division parameter, a camera frequency multiplication parameter and a visual detection precision; and determining the labeling delay of the target pole piece according to the second distance, the camera frequency division parameter the camera frequency multiplication parameter, and the visual detection precision.

* * * * *